Dec. 15, 1964 P. WILLEMS 3,161,402
PROCESS AND APPARATUS FOR OSCILLATORY
TREATMENT OF FUSIBLE MATERIALS
Filed Jan. 21, 1963 6 Sheets-Sheet 1
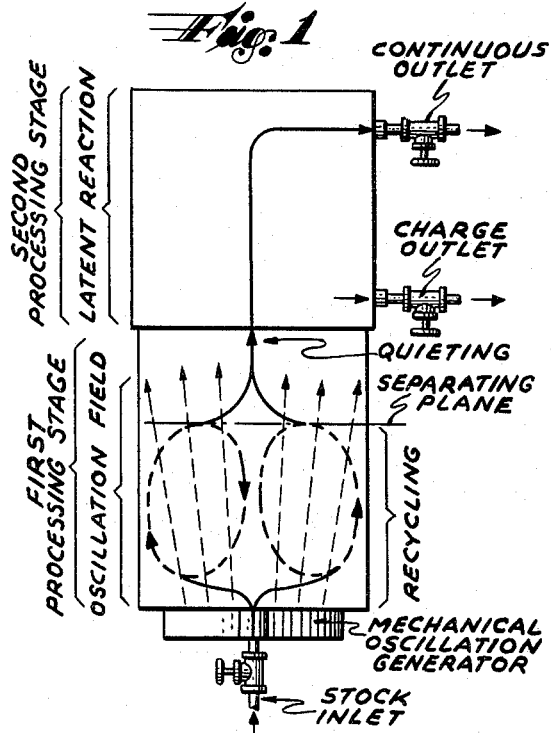
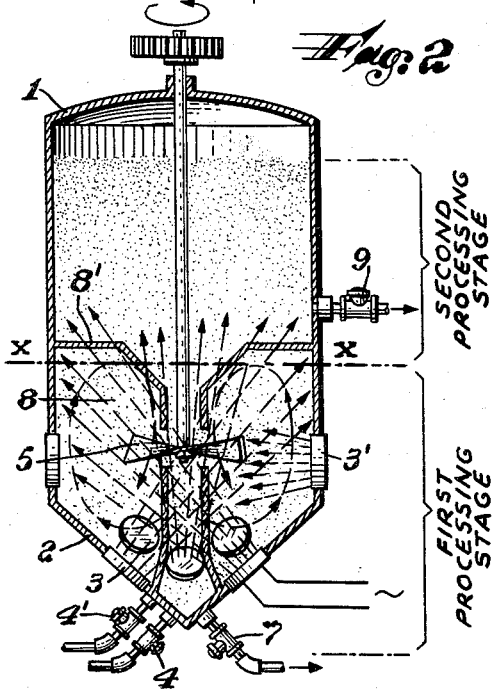
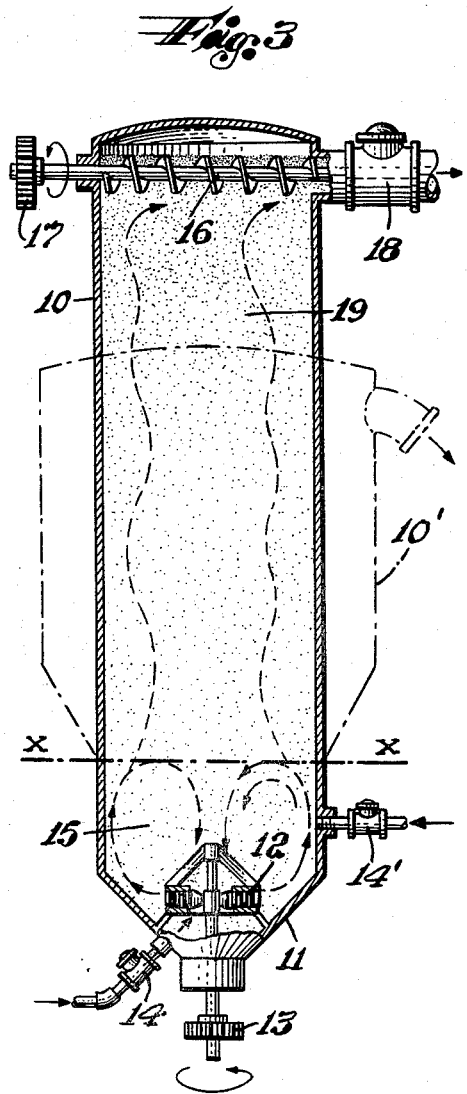
INVENTOR.
Peter Willems
BY

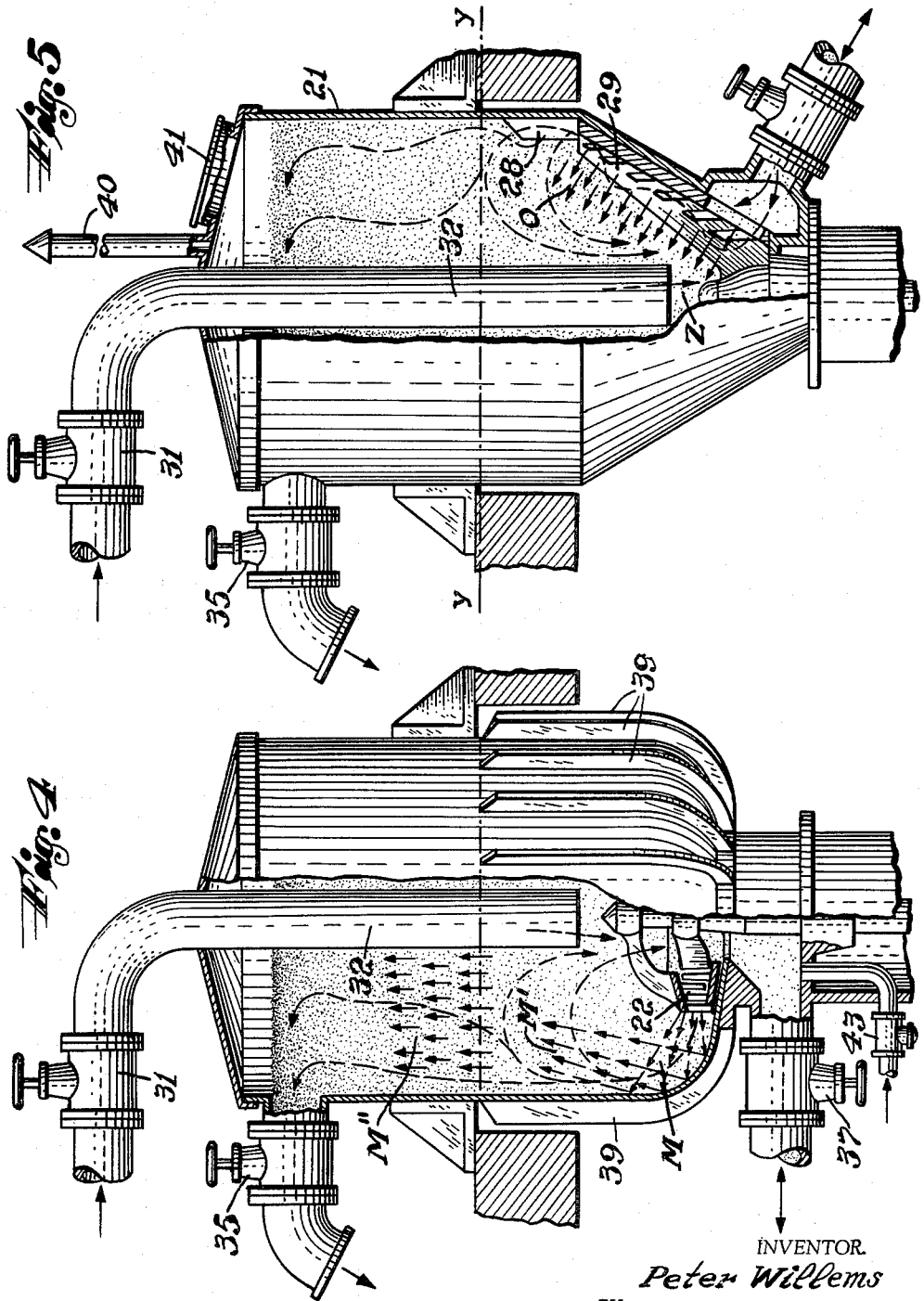

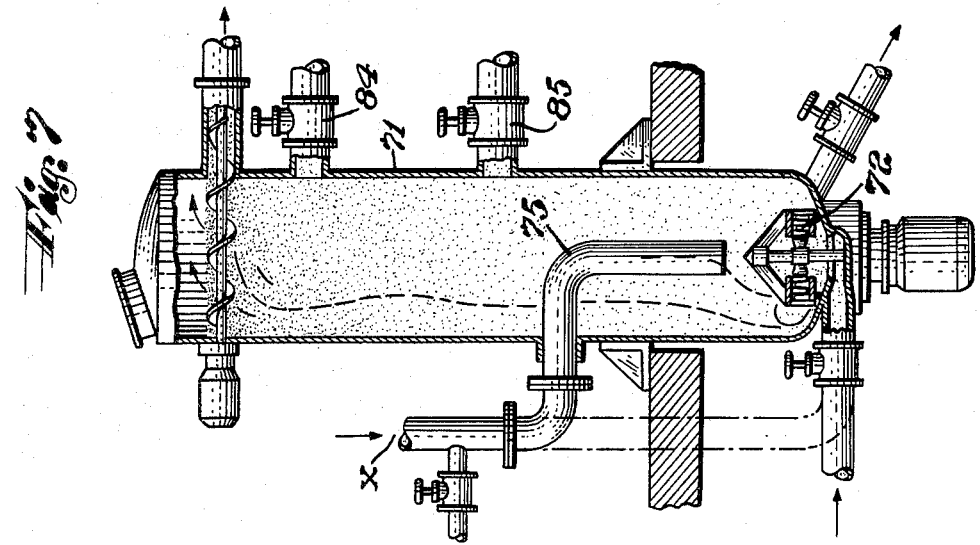
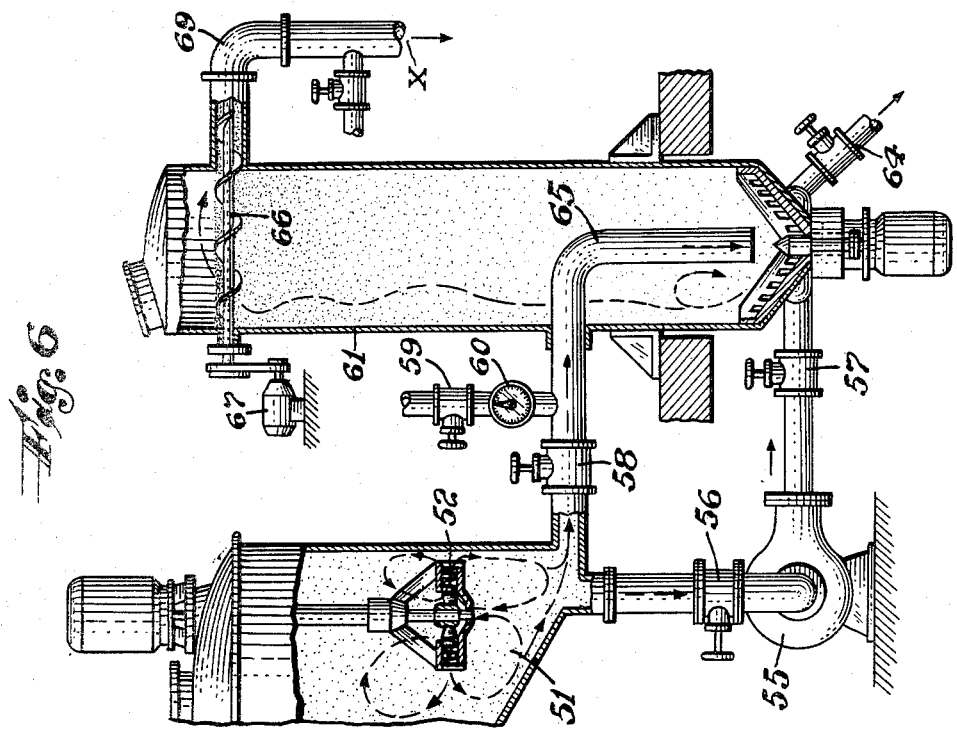

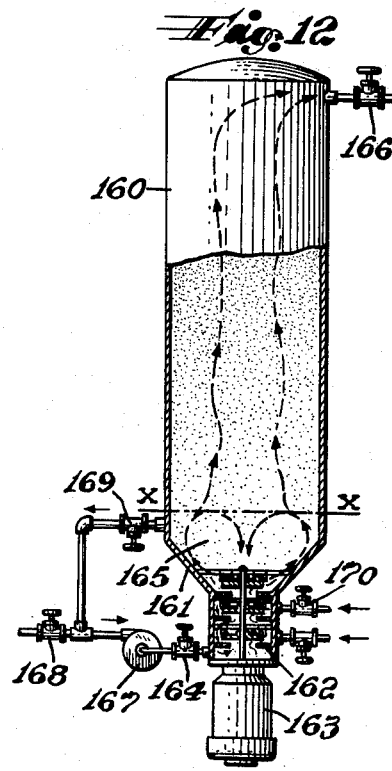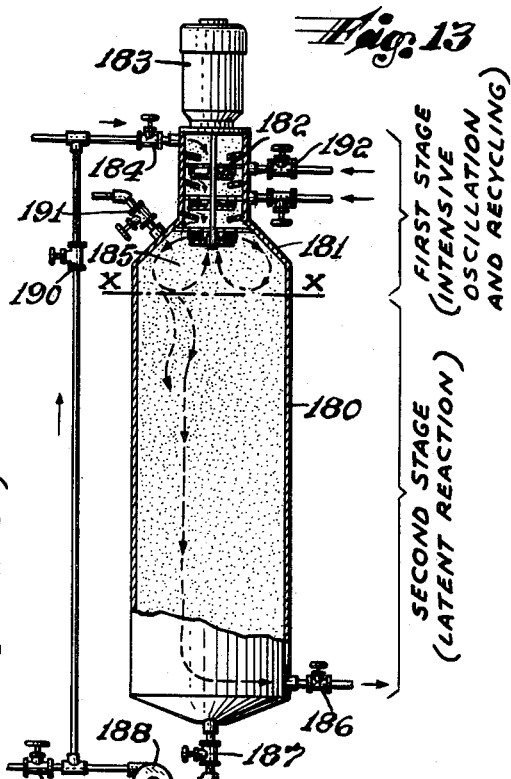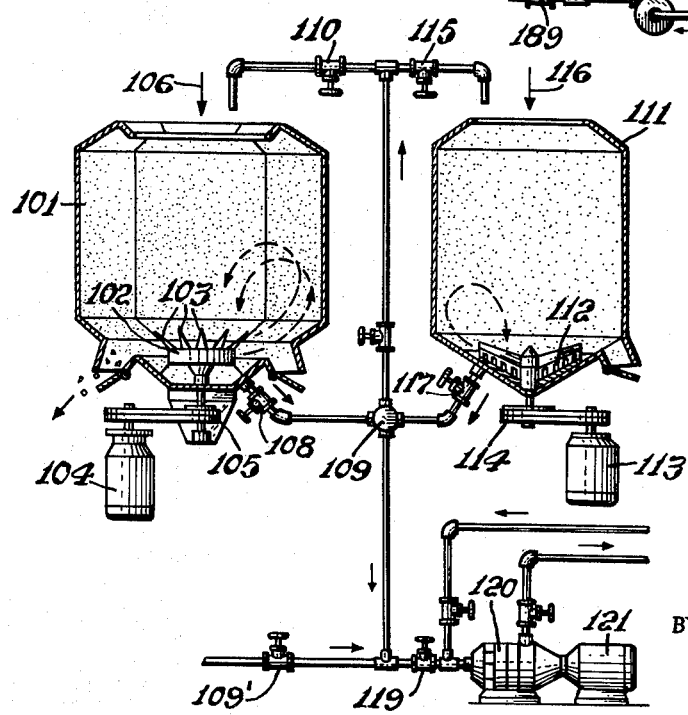

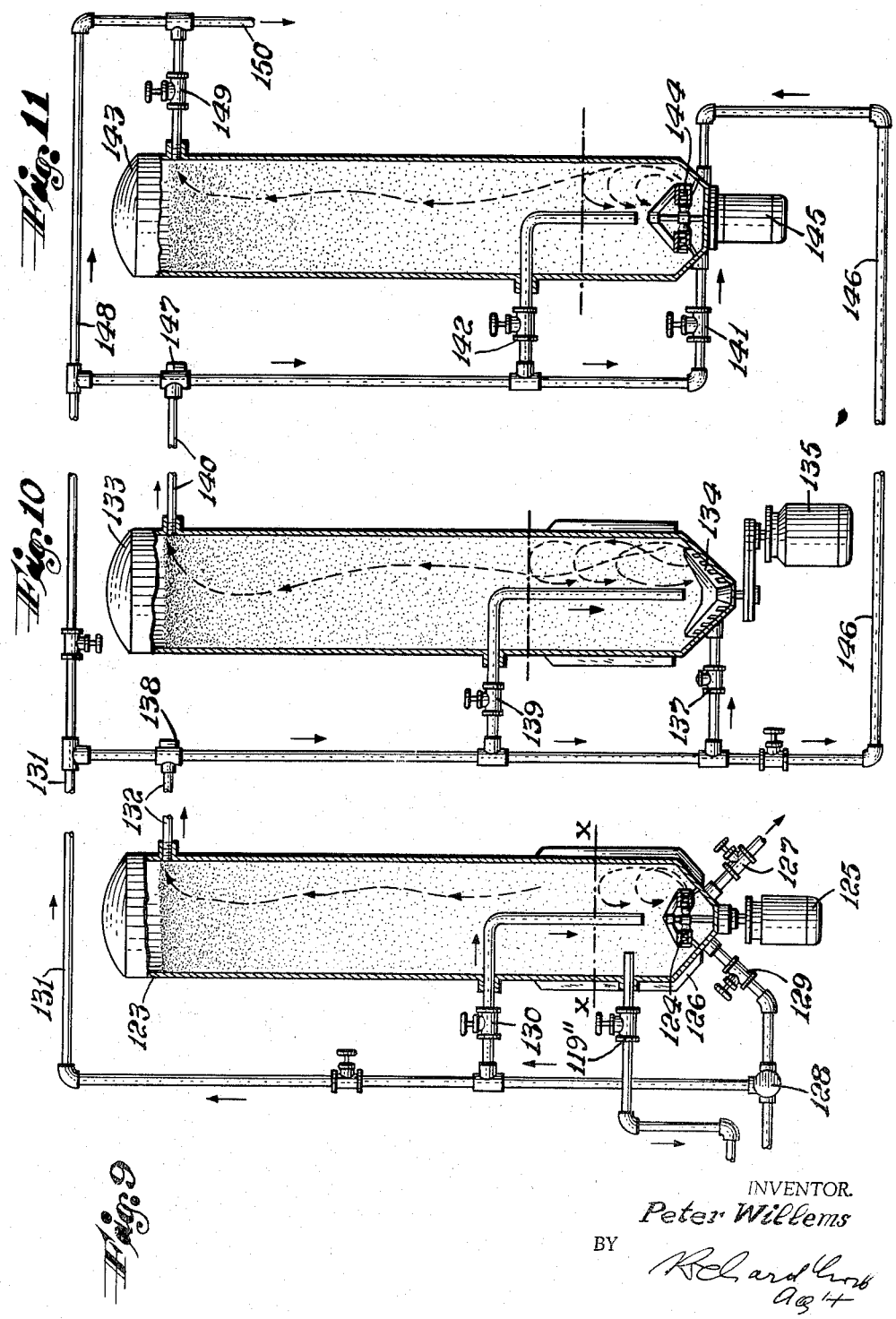

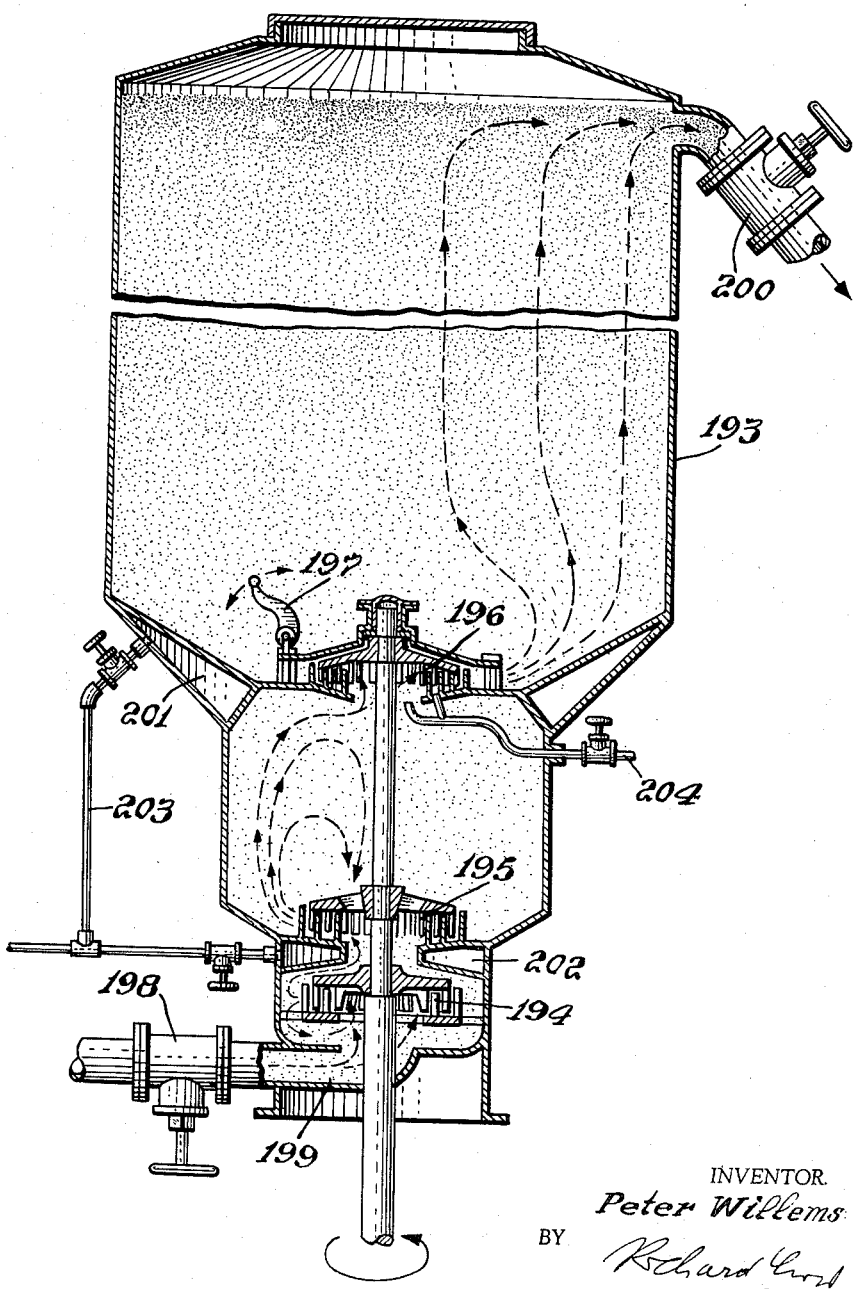

3,161,402
PROCESS AND APPARATUS FOR OSCILLATORY TREATMENT OF FUSIBLE MATERIALS
Peter Willems, 20–22 Steinhofhalde,
Lucerne, Switzerland
Filed Jan. 21, 1963, Ser. No. 253,243
Claims priority, application Switzerland, Jan. 22, 1962,
710/62
24 Claims. (Cl. 259—8)

The invention relates to a process and apparatus for the oscillatory treatment of pumpable materials.

The term "fusible materials" as employed herein refers not only to those materials and mixtures of substances which are, as such, capable of flowing or pouring, and thereby also of being pumped, but also to materials and mixtures of materials which can be made pumpable by being introduced into a carrier liquid and heated or subjected to other treatment.

In this connection the structure of the individual particles of the stock to be treated is of no consequence. Thus, not only amorphous and crystalline substances may be treated, but also fibrous materials, and particularly materials containing cellulose, for example, as employed in the chemical and paper industry for the production of most varied finished articles, such as paper, rayon, rayon staple fibers, to name a few.

The purpose for which the oscillatory treatment is applied to the materials, or mixtures of materials is also inconsequential as regards the teaching of the invention. The oscillatory treatment may be employed to accomplish a large number of feasible and known purposes, such as, dissolving, mixing, pulversizing, disintegrating, all manner of digesting, refining, homogenizing, impregnating, swelling (hydrating), polymerizing, and condensing, to mention a number of operations performed or enhanced by the treatment in accordance with the invention. Further, two or more of the physical or chemical changes may be accomplished sequentially or simultaneously. The essential aspect of the process pursuant to the invention is the fact that one or more physical or chemical changes are effected or promoted by the otherwise familiar action of high-frequency pulses or oscillations, particularly oscillations or pulses at a frequency within the ultrasonic range (above about 16 kilocycles).

The physical or chemical treatment of materials in accordance with the invention may be accompanied or supplemented by treatments in accordance with conventional processes.

In the case of many of these physical and/or chemical processes, resort has been had, with good advantage, to so-called columns or towers. By means of the latter it is possible to slow the individual processing steps, or, where necessary, it is also possible to apply the processes to greater heads and/or surfaces of the material while processing larger quantities of stock.

The chemical engineering art also recognizes the proven efficiency of conducting certain processes in columns and towers, the interiors of which are filled with members of different shapes for the purpose of deflecting and enlarging the contact surfaces and for the purpose of producing turbulent flows, whereby the stock to be treated flows through the numerous cavities which are formed by the filling members. These measures also aim at slowing down of the kinetics of the reaction, and frequently also at a prolongation of the reaction course, as such, and thereby result in an appreciable increase in the duration of the reaction. Moreover, while the flow in the numerous cavities defined between the filling members is, to a large extent, compensated, no control has yet been devised for the individual flow and reaction processes in the cavities between the so-called filler members, even though such control is recognized to be highly desirable.

In recent years, an ever expanding body of knowledge has been developed with respect to the technology of physical processing and chemical reactions by a method of treatment of materials which has been referred to in the literature on the subject as the "Kinematic High-Frequency-Technique" (such as, for example, Prof. P. Willems in the DECHEMA Monographie, vol. 28, 1956, pp. 173–190; the same author in the Bulletin A.T.I.P., Paris, No. 2, 1960, pp. 66–83; Prof. O. Fuchs in the Chemiker Zeitung, Heidelberg, Issue No. 24, 1960, pp. 809–814). Such method is characterized by high-frequency liquid propagated pulses or cavitation attended, in some instances, by simultaneous shearing and shredding of the materials to be treated, with the frequencies of the pulses or oscillations propagated thereby being, as required, within the audio and/or ultrasonic range, and the materials being subjected to a treatment of high intensity but for the most part of short duration.

However, many physical or chemical treatments of materials require, for optimal results, that the material should be subjected to a very rapid absorption of the physical or chemical activating energy, followed by an aging process in the course of which the decay of the activating energy may continue to the point of equilibrium. Such a physical aging process is represented, for example, by sedimentation, while a frequently used chemical aging process is that generally known as "latent reaction." A practical example of an aging process, in the area of cellulose processing, is the latent saturation of cellulose-bearing stock with alkaline, acid or neutral media, for the purpose of dissolving, homogenizing, impregnating, swelling, bleaching, dyeing, finishing, gluing, macerating or other processes. Processes of this type require many hours to proceed to completion according to conventional methods. In this connection, it is frequently necessary to repeat the same treatment of the material, for example, calcium hypochlorite bleaching in a number of columns or towers arranged in sequence, to bring the material to the intended degree of whiteness. In many instances, it is necessary to supply heat and/or to perform the treatment under pressure, for the purpose of attaining the intended degree of processing within economically reasonable time limits. Further, in some processes it is necessary to employ increased quantities of basic, acid or neutral reagents for the treatment of the starting materials in order to avoid excessive consumption of energy, for example, the energy required to produce elevated pressures.

As against these conventional methods, the method embodying this invention affords the advantage of appreciably simplifying processes of the described type, while reducing the time consumed and assuring a more economical accomplishment of the same.

The process according to the invention is characterized by the continuous feeding of the stock into a pressure chamber having a turbulent recycling zone which is traversed by high-frequency oscillations and pulses generated by at least one mechanical oscillator, where the material is continuously tumbled and rotated or recycled at a comparatively high rate of speed so as to be repeatedly acted upon by the oscillator and thereby refined and activated by the high-frequency oscillations, whereupon the material is gradually transferred from the turbulent recycling zone, at a relatively low rate of speed to a relatively placid or quiescent zone where it is subjected to an aging process. The duration of the stay of the material in the turbulent recycling zone is regulated by adjusting the rate at which the stock is introduced into the pressure chamber, and the speed of rotation or recycling of the stock in the turbulent zone or zones is regulated by adjusting the operating speed of the oscillator or oscillators.

The process according to the invention thus generally includes two stages. The first stage consists of the intensive treatment of the stock while the latter is being tumbled and recycled, and, in the second stage the stock thus activated is subjected to an aging process preferably under pressure, for example, from the head of material in the chamber.

The novelty of this combination resides in the fact that it makes feasible both the absorption of the activating energy by the stock, and the decay of same in the stock, with both of these phases of the process being capable of regulation independent of each other or in combination. Thus, the effects of the individual phases or steps of the process can be coordinated with all of the characteristics of the stock to be treated, and this possibility leads to surprising results. Thus, for instance, when cellulose pulp is treated by the process according to the invention, remarkedly hydrated and fibrillated fiber is obtained, which does not exhibit any deleterious shortening of the fiber lengths. These fibers are amenable to further processing for the production of paper with an unusually high tear and bursting strength. This unanticipated improvement in quality is probably attributable primarily to the fact that treatment of the stock in accordance with the invention prevents any undesirable boost of the grinding index (° SR) and any appreciable pejorative effect on the dehydrating ability in the forming of sheets.

The apparatus required for the practice of the process according to the invention, generally comprises a pressure tank having at least one outlet and at least one adjustable inlet for the stock, and at least one mechanical oscillator in the tank which circulates or recycles a portion of the stock in the pressure tank, the latter being designed and dimensioned so that the circulatory or recycling flow of the stock by the oscillator or oscillators extends only over part of the tank length, but fills out nearly the entire cross-section of the tank.

The mechanical oscillator may be constituted by any device which is operative to generate mechanically excited high-frequency oscillations, and to simultaneously effect intensive circulation or recycling of the stock to be treated by the oscillations. Devices which are most advantageous for the above purpose may be of the type of high frequency oscillators described in detail in U.S. Letters Patent No. 2,619,330 and No. 2,789,800.

Further details, advantages, and areas of application of the process and apparatus embodying the invention are indicated in the following detailed description of illustrative examples thereof which is to be read in connection with the accompanying drawing, wherein:

FIG. 1 is a schematic view illustrating the phases of treatment of material in accordance with the process embodying the invention;

FIG. 2 is a view similar to that of FIG. 1, but having different devices for creating the oscillations at high frequency;

FIG. 3 is a diagrammatic view in vertical section of an apparatus according to the invention;

FIGS. 4 and 5 are diagrammatic views, in vertical section, of two types of apparatus according to the invention, and which are shown in tandem arrangement;

FIGS. 6 and 7 are diagrammatic views of two additional types of apparatus according to the invention, and which are also shown in tandem arrangement;

FIGS. 8 to 11 are a diagrammatic representation of another plant for the oscillatory treatment of materials, and which includes a number of partially different devices according to the invention;

FIG. 12 is a diagrammatic view, in vertical section, of a further type of apparatus according to the invention, which apparatus has a multi-stage oscillator at the bottom of a vertical tank or tower;

FIG. 13 is a view similar to that in FIG. 12, but with the multi-stage oscillator at the top of the tank or tower; and FIG. 14 is a diagrammatic, vertical sectional view of still another type of apparatus embodying this invention.

Referring in detail to FIG. 1 which serves to illustrate the principle of the process according to the invention, it will be seen that the stock to be treated is there introduced continuously at the bottom of a pressure chamber traversed by the oscillating field of a mechanical oscillator or oscillation generator, with the rate of feed of the stock being controlled with precision. The feed of the stock is preferably under pressure which may be generated in the delivery line by familiar means, such as, pumps, or suitable heads of the stock. The stock which is introduced into the pressure chamber is continuously recycled at a relatively high rate of speed, in a first stage or zone where it is repeatedly supplied to the oscillator so as to be refined and simultaneously activated by the high-frequency oscillations. The activation consists in the absorption of oscillatory energy which may result in a visible or an invisible change, such as, turbulence, a rise in the temperature, a gain in affinity, or the like. During the oscillatory treatment, which takes place simultaneously with the continuous formation of new reaction surfaces and contact surfaces in the stock, the high-frequency liquid pulses and oscillations originating in the oscillator are propagated through the stock at a speed corresponding to the material of the stock. For example, in an aqueous media or suspensions in water, the oscillations are propagated with a speed of about 1500 meters per second. In the turbulent and recycling zone, the stock is recycled up to a "separating plane." The latter should not be regarded as a plane in the geometrical sense, but rather as a thin zone extending across the pressure chamber, and to which the recycling flow of the stock extends. At the side of the separating plane remote from the recycling zone is a "quiescent zone." Since, as indicated above, the stock is continuously fed into the pressure chamber, the stock first fills the turbulent and recycling zone completely, and, as the feed of stock continues, stock treated in the recycling zone permeates gradually and at a relatively low rate of speed, beyond the separating plane into the relatively placid or quiescent zone. As this continues, partial flows continue to permeate from the recycling flow in the area of the separating plane outside of the region of effectiveness of the suction produced by the oscillator, and thereby reach the quiescent zone. In this manner the upper part of the pressure chamber which also serves as a quiescent zone, becomes gradually charged with stock. This gradual filling of the entire quiescent zone represents the second stage, in the course of which the stock is subjected to an aging process. As indicated on FIG. 1, by the broken arrows, the high-frequency liquid pulses and oscillations emanating from the oscillator are propagated through the stock beyond the separating plane, so that at least a portion of the stock lodged in the quiescent zone also undergoes the action of the oscillations, though with less intensity than is the case in the turbulent and recycling zone. The duration of the stay of the stock in the turbuent and recycling zone, that is to say, its "staying span" in this zone, can be regulated by varying the rate at which the stock enters the pressure chamber. The rate of recycling of the stock in the turbulent and recycling zone, on the other hand, can be varied by adjusting the speed of rotation of the oscillator. As the rotational speed of the oscillator is increased, the separating plane is displaced upwardly, that is, further into the quiescent zone, while a decrease in the oscillator speed has the opposite effect.

In some instances, say in the case of chemical processes, no more than a gradual quieting of the stock permeating into the quiescent zone is desirable in order for the stock to continue reacting while in a more or less turbulent condition upon first entering the quiescent zone, with the turbulence decreasing as the stock moves in such zone away from the separating plane. For this purpose, the quiescent zone can be provided with progressively increasing cross-sectional areas in the direction away from the separating plane. Pursuant to the invention, the zone is dimensioned in the direction of movement of the stock therethrough to the outlet so that the stock attains the optimal or desired degree of aging (state of equilibrium) at the end of its travel through that zone. At the same time, the feed rate of the stock is regulated and controlled, taking into account the length of the quiescent zone so that, upon discharge from that zone, the aging process is terminated, that is, the stock has received optimal treatment.

The control of the duration of recycling of the stock in the turbulent and recycling zone, that is, the staying time of the stock in this zone, and thereby also the staying time of the stock in the quiescent zone, can also be accomplished by back or counter-pressure applied to the stock in the quiescent zone.

In the apparatus for practicing the process according to the invention, as indicated schematically on FIG. 1, the pressure chamber is substantially in the form of an upstanding column provided at the upper end with a continuous exhaust and at the lower end with an adjustable inlet for the stock. Mounted in the lower part of the pressure chamber is a mechanical oscillator or oscillating generator which continuously aspirates a portion of the stock to be found in the pressure tank and centrifugally expels the same, while all the time subjecting the stock recycled in this manner to high-frequency liquid pulses and oscillations, with a high degree of intensity. The mechanical oscillator may be advantageously of the types disclosed in detail in U.S. Letters Patent No. 2,619,330 and No. 2,789,800. In special instances, for example, when the stock to be treated is of particularly high concentration, viscosity or thixotropy, the recycling of the stock can be intensified or further promoted by means of known devices, such as, propeller agitators, circulating pumps, or the like. The pressure tank is, according to the invention, shaped and dimensioned so that the recycling flow of the stock fills out the entire cross-section of the tank in the inspirating region of the oscillator, which extends over only a portion of the tank length, thereby to avoid the formation of "dead areas" in the turbulent and recycling zone. In order to best accommodate the lower part of the pressure tank to the recycling flow, the tank can be shaped conically in this area, as will be described hereinafter after with reference to a number of particular embodiments of the invention. The upper part of the pressure tank, representing the quiescent or placid zone, can be shaped cylindrically or conically (diverging upward) and have a larger diameter than the lower part of the tank, depending on the desired rate of feed. The choice of shape and dimensions for the pressure tank is governed by the intended operating conditions and may be determined by one skilled in the art. In place of the continuous exhaust at the upper end of the pressure tank, a charge outlet may be provided at a lower location. The continuous discharge or exhaust can be simply in the form of an overflow, for example, consisting of a vertical pipe inside the pressure tank having its upper end open near the top of the tank and extending out of the lower area of the tank. For the purpose of building up a counter-pressure in the pressure tank, the continuous exhaust can be provided with a manually or automatically actuated regulating valve, and the charge outlet near the bottom of the quiescent zone may also have a valve associated therewith. Additional valved outlets may also be provided at different levels between the two outlets shown on FIG. 1.

In the case of vertically mounted pressure tanks, the oscillator need not necessarily be built into the lower end of the pressure tank. It can be mounted instead at the upper end of the pressure tank, in which case the stock inlet is located at the upper end of the pressure tank. In that event, care must be exercised that the pressure tank is at all times filled to capacity with stock. Obviously, the pressure tank can also be mounted in either a horizontal or arbitrarily tilted position, provided that care is taken to ensure that the oscillator is at all times surrounded by the stock.

FIG. 2 shows a pressure tank 1 having magnetostrictive ultrasonic transducers 3, 3' mounted at its lower end in such a manner that the ultrasonic waves radiated therefrom encounter each other about at the tank axis. Since the magnetostrictive ultrasonic transducers are not themselves capable of recycling the stock, an additional, mechanically driven recycling propeller 5 is provided. In order to ensure that the recycling flow functions properly in the hydrodynamic sense within the lower zone 8 of the pressure tank 1, which serves the purpose of accomplishing the first stage, deflector plates 8' are provided therein. Furthermore, the lower end 2 of the pressure tank is conical with its diameter increasing upwardly. The separating plane is designated at $x—x$. The stock to be treated is delivered to the pressure tank 1 from below through an inlet pipe equipped with a regulating valve 4. The fully processed stock is discharged through an exhaust pipe having a control valve 9 and extending from the bottom of the quiescent zone of the pressure tank 1 or through a discharge pipe having a valve 7 and opening from the bottom of the tank for use when a batch process is employed. A conduit provided with a regulating valve 4' also opens into the bottom of tank 1 so that additives can be continuously or intermittently introduced into the pressure tank 1 for mixture with the stock. The additives thus introduced may be solvents or diluents, emulsifiers, bleaching agents and the like. Although the apparatus of FIG. 2 does not employ mechanical oscillators, it has been described herein to show that the process according to the invention is theoretically also capable of being carried out with magnetostrictive or piezoelectric ultrasonic transducers as the source of the oscillations. However, the practical use of the apparatus of FIG. 2 is inhibited by the fact that the ultrasonic transducers of this type have a much too low specific intensity (w./cm.$^2$).

Referring now to FIG. 3, it will be seen that the pressure tank 10 extends vertically upward, and at the lower end 11 thereof is provided with a mechanical oscillator 12 of the type disclosed in U.S. Letters Patent No. 2,619,330. The oscillator is driven by way of a spur gear 13 or belt pulley on the shaft of its rotor, or directly by means of an electric motor (not shown) mounted on the pressure tank 10 and having its shaft coupled to the rotor shaft. The stock to be treated is delivered to the lower end of tank 10 by means of an inlet provided with a regulating valve 14. The stock thus introduced is continuously recycled in the turbulent and recycling zone 15 by means of the oscillator 12, the recycling flow extending up to the level of the separating plane $x—x$. During the course of such recycling of the stock, the latter is subjected to the intensive, high-frequency liquid pulses and oscillations. The stock which is thus refined and activated is conveyed in partial flows, gradually, and at a relatively low rate, in an ascending stream, to the relatively quiescent zone 19 and subjected therein to an aging process. The stock which has undergone the optimum treatment is discharged continuously through an outlet conduit which is provided with a regulating valve 18. The regulating valve 18 adjusts the back or counter-pressure on the stock in tank 10 and makes it possible to adjust the rate of feed of the stock into the pressure tank 10 independently of the setting of the regulating valve 14. Such a counter-pressure continues building up steadily where, given an identical intake and outlet speed of flow of the stock, the outlet cross-section of the pressure tank is smaller than the inlet cross-section, owing to the fact that only as much stock can be charged into the pressure tank 10 as is discharged from it. In place of the regulating valve 18, the counter-pressure could, of course, also be generated by other equivalent means, for example, by means of the illustrated conveyor screw 16 which positively controls the rate of discharge through the outlet and which is driven through a gear or pulley 17 from a variable speed electric motor (not shown). Where the apparatus is to be used for a batch process, the valved discharge conduit can extend from the lower end of the tank, as at 7 on FIG. 2, and compressed air, an inert gas or another gaseous medium under pressure can be suitably fed into the upper part of the pressure tank 10, so that the stock therein is subjected to counter-pressure.

A pipe line or a number of pipe lines each provided with a dosage device or regulating valve 14' also open into tank 10 so that substances of any arbitrary degree of aggregation and of any arbitrary structure, can be mixed, at any expedeint point of delivery, with the stock to be found in the pressure tank, either during the first or the second processing stage. Thus, water, vapor, reagents, catalysts, fillers, dyes, frothing agents, and the like may be added to the stock or starting material. These additives can also be introduced inside the oscillator 12 through passages in the members of the stator and opening into the operating gap of the oscillator. Depending on the requirement, the cross-section of that portion of the pressure tank constituting the quiescent zone can be varied accordingly. Thus, for example, as indicated by the broken lines 10' on FIG. 3, the upper portion of the tank has an increased diameter, in those cases where it is desired to have a very low feed rate in the second stage for the purpose of achieving a latent reaction. The lower part 11 of the pressure tank 10 is of conical upwardly diverging shape, so that the recycling flow of the stock fills out the entire cross-section of the tank.

FIG. 4 shows another form of apparatus according to the invention, in which the lower portion of the tank is semi-spherical and has therein an oscillator 22 as disclosed in U.S. Letters Patent No. 2,619,330. The valved inlet 37 for the stock is at the bottom, while the stock is exhausted at the top through a valved outlet 35. Additives can be introduced in the stock through a pipe 32 having a regulating valve 31 therein and extending downwardly at the center of the tank to open above the oscillator 22. Additives also can be delivered from below through a valved conduit 43. For the purpose of dissipating undesirable heat, the pressure tank has cooling fins 39 on its lower part. In place of the fins 39, the tank could be provided with a jacket through which a cooling or heating medium can be circulated.

The apparatus illustrated in FIG. 5 differs from the one displayed in FIG. 4 substantially only in that the oscillator 29 in pressure tank 21 is constructed in accordance with the disclosure in U.S. Letters Patent No. 3,054,565. Since this oscillator provides an open central area Z, the pipe 32 can be extended further downward than in the apparatus of FIG. 4. The upper part of the pressure tank 21 is provided with an air-vent pipe 40 and a lid 41. In order to prevent rotation of the stock about the tank axis as it is being recycled in the first stage, axially oriented guide plates 28 are provided on the inner side of the pressure tank 21, between the separating plane y—y and the upper end of the oscillator 29.

The different directions of propagation of the oscillations in the apparatuses of FIGS. 4 and 5 are indicated by arrows M, M' and M'' and arrows O, respectively.

It will be noted in FIGS. 6 and 7 that the process embodying the invention can also be employed as an intermediate stage of a multi-stage process. Thus, for example, the stock may be pretreated by means of an oscillator 52 according to the disclosure in U.S. Letters Patent 2,619,330 or No. 2,789,800, which effects continuous recycling in a tank 51 in the shape of a boiler and is delivered through the pipe line 65 which opens downwardly into the column or tower 61. Opening into a horizontal part of the pipe line 65 is a valved conduit 59 for additives which has a metering instrument 60 interposed therein to give a reading of the flow, the pH value, the temperature or other properties of the additives. Where the work is being performed on a particularly viscous or hard substance, in which case the oscillator 52 may not suffice to effect its advance homogeneous fragmentation, then a regulating valve 53 in pipe line 65 is closed, and the stock is conducted into a high-frequency oscillator 55 as disclosed in U.S. Letters Patent No. 3,062,457, by way of a pipe which is provided with a regulating valve 56 and which leads downward from the floor of the tank 51. The oscillator 55 ensures the most intensive digesting of even the hardest or refractory materials. The outlet of the oscillator 55 is connected to a pipe line which is equipped with a valve 57 for regulating the staying time (duration of stay) and the counter-pressure, and such pipe line opens into the column 61 from below. An oscillator according to U.S. Letters Patent No. 3,059,565 is installed (as shown on FIG. 5) in the conical lower portion of column 61. Extending downwardly from the conical lower portion of the column 61 is a charge outlet duct 64 which is provided with a regulating valve. Again, the first stage of the intensive oscillatory treatment, recycling and activation of the stock, takes place in the lower part of the column 61. At the separating plane (not indicated in FIG. 6), the stock passes into the second processing stage which is that of aging. A continuous outlet 69 extends from the upper end of the column 61, and is provided with a counter-pressure device in the form of a conveyor screw or worm 66 driven by an electric motor 67. Following the treatment in the column 61 the stock can be subjected to a further treatment in a column 71, for example, one accomplished with a lower frequency of oscillation. Installed in the column 71, according to the disclosure in U.S. Letters Patent No. 2,619,330, is an oscillator 72. The column 71 is equipped with two valved outlets 84 and 85 which are located at different levels intermediate the top and bottom of the relatively quiescent zone. The design of column 71 is otherwise substantially identical with that of column 61. The break indicated at x between the outlet 69 of column 61 and the inlet pipe 75 of column 71 is to indicate that, between the two columns, the stock may be routed through one or more processing stages.

Such devices include a tank 101 having, in the bottom thereof, an oscillator 102 of a type disclosed in detail in my co-pending application for U.S. Letters Patent Serial No. 729,694, filed April 21, 1958, now Patent No. 3,125,-305, which corresponds to Swiss Patent No. 335,770. The oscillator 102 has a rotor with upwardly directed prongs or teeth 103 for tearing or mascerating the stock, and such rotor is driven by an electric motor 104 through a belt and pulley transmission 105. The stock, or at least one constituent thereof may be introduced into tank 101 from above, as indicated at 106, while the valved return pipes 110 and 115, respectively, extending from three-way valve 109.

A second tank 111 has another constituent of the stock to be treated introduced at the top, as indicated at 116. An oscillator 112 of the type disclosed in U.S. Letters Patent No. 3,054,565 is disposed at the bottom of tank 111 which has a valved outlet 117 also connected to three-way valve 109. The rotor of oscillator 112 is driven by a motor 113 through a belt and pulley transmission 114. The stock constituents treated in tanks 101 and 111 can be recirculated therethrough by way of valved return pipes 110 and 115, respectively, extending from valve 109.

The three-way valve 109 is also connected to the valved inlet 119 of a high-frequency oscillator 120 of the type disclosed in U.S. Letters Patent No. 3,062,457 and which is driven by a motor 121. A valved conduit 109′ also communicates with inlet 119 for the supply of desired additives to the stock.

The plant of FIGS. 8 to 11 further includes columns 123, 133 and 143 having, in their lower portions, oscillators 124, 134 and 144, respectively. The oscillators 124 and 144 are of the type disclosed in U.S. Letters Patent No. 2,619,330, while oscillator 134 is of the type disclosed in U.S. Letters Patent No. 3,054,565. The oscillators 124, 134 and 144 are suitably driven by motors 125, 135 and 145, respectively.

In order to provide great flexibility in the treating of stock in the illustrated plant, the valved outlet 122 of oscillator 120 is connected, by way of a three-way valve or selector cock 128, with a valved inlet 129 opening into column 123 below oscillator 124 or with a valved inlet 130 extending downwardly in column 123 and opening above oscillator 124. The lower portion of column 123 may be finned, as at 126, to dissipate heat, and a valved outlet 127 extends from the bottom of column 123 for the discharge of stock sufficiently treated at that stage of the process. A valved return line 119″ extends from the turbulent and recycling zone of column 123 below the separating plane x—x, and returns to the inlet of oscillator 120 through a regulating valve 119′. A continuous outlet 132 extends from the top of column 123 to a three-way valve or selector cock 138 by which the stock treated in column 123 can be fed to column 133 or made to by-pass the latter. Further, a valved conduit 131 extends from valve 128 so that the output of oscillator 120 can be made to by-pass the treatment in column 123 and go directly to valve 138 or to a valved conduit 148 leading to the discharge pipe 150 of the plant.

The column 133 has valved inlets 137 and 139 extending from selector cock 138 and opening below and above oscillator 134, and a continuous outlet 140 extends from the top of column 133 to a three-way valve or selector cock 147. The valve 147 connects selectively with the conduit 148, or with the valved inlets 141 and 142 opening in column 143 below and above oscillator 144.

The column 143 has another valved inlet pipe 146 opening below oscillator 144 and branching from the inlets 137 and 139 of column 133. Finally, the column 143 has a valved outlet 149 extending from the top thereof to the discharge pipe 150.

FIG. 12 shows a device according to the invention with a pressure tank 160 extending upward from a lower portion accommodating an oscillator 162 which is preferably of the type disclosed fully in U.S. Letters Patent No. 2,882,149, and thus consists of three dispersing and homogenizing units, in each of which the stock is subjected to the action of high-frequency oscillations and simultaneously recycled in a continuous manner. The activated stock gradually rises upward in the pressure tank 160 in a quiescent zone above the separating plane x—x.

The tank or column 160 has an upwardly diverging section 161 above the oscillator 162 which is driven by a motor 163, and recycling is intended to occur in the turbulent zone 165 in section 161 below the separating plane x—x.

The stock is supplied through a valved pipeline 168 by way of a pump 167 and valved inlet 164. Additives may be introduced in the stock during treatment of the latter by the oscillator through valved inlets 170. If desired, the stock can be recirculated from the turbulent zone 165 by way of a valved conduit 169 extending back to the inlet of pump 167. Finally, a valved outlet 166 extends from the top of tank or column 160.

The apparatus of FIG. 13 is substantially similar to that of FIG. 12 with the exception that the tank 180 has the oscillator 182 in its upper end portion above an upwardly converging section 181 in which a turbulent zone 185 is created above the separating plane x—x. The oscillator 182 is driven by a motor 183 and has the stock supplied thereto through a valved inlet 184, while additives can be introduced at 191 or 192. The treated stock is removed through valved outlet 186, or returned for further treatment through valved outlet 187, pump 188 and valved return pipe 190. If desired, the output of pump 188 can be discharged through valved outlet 189, rather than being returned to the inlet of the apparatus. In the apparatus of FIG. 13, the column 180 must be filled with stock at all times.

FIG. 14 illustrates an apparatus according to the invention, where three oscillators 194, 195 and 196 are mounted in the pressure tank 193. The lowest oscillator 194 corresponds to a unit of the apparatus disclosed in U.S. Letters Patent No. 2,882,149; the oscillator 195 is a device of the type disclosed in U.S. Letters Patent No. 2,789,800; and the upper oscillator 196 corresponds to the device disclosed in U.S. Letters Patent No. 3,062,457. The oscillator 196 is provided with a duration (staying time) and counter-pressure regulating device 197 which is accessible for control and maintenance from the outside of tank 193. The counter-pressure generated by the device 197 reacts on the oscillators 195 and 194 to control recycling of the stock in the latter, and also to control the admission of the stock in the inlet pipe 199 which is provided with a regulating valve 198. Similarly, the counter-pressure which is adjustable at the upper end of the pressure tank 193 by means of the outlet regulating valve 200, reacts on the recycling in oscillators 194 and 195 and on the inlet feed rate. By means of pipe 204 and other additional pipes (not shown), additives can be introduced at any expedient points within the tank 193 and within the oscillators 194, 195 and 196. Cavities or jackets 201 and 202 are provided at suitable locations around tank 193 to receive a cooling or heating medium supplied through the pipes 203. Although the oscillators 194, 195 and 196 are capable of functioning under completely varying conditions and with diverse operating characteristics, such as, frequency and intensity, it is nevertheless possible to drive them with a single motor (not shown).

It should also be noted that in place of the above mentioned "oscillators," use may also be made of devices which do not come within the descriptive designation of "oscillators," but which perform an equivalent function, such as, for example, high-speed disintegrators, the rotor and stator elements of which are primarily intended to act as a pump, but which exhibit so narrow a gap between them that high-frequency liquid pulses or oscillations are produced.

It is furthermore feasible in the case of the devices and processes according to the invention, to control or monitor, in a partly or fully automatic manner the pressure regulating valves, the rate of travel of the stock, the speed of the oscillators, the durations (staying time), conditions of the stock (temperatures, pH values, specific gravity, and the like), as well as the entire course of the treatment, with conventional automated control devices.

Specific examples of processes according to the invention are given below:

*Example 1*

Using an apparatus, for example, as shown on FIG. 3, a sulphite cellulose with a 6% concentration is recycled in the oscillatory field of the first stage for about 6 minutes, with a circulating speed of about 5 meters per second, so that during its period of stay (staying time) in the turbulent and recycling zone 15, each particle of the stock is time and again recycled through the oscillator 12. Thus, chemically reactive substances contained in the stock are subjected to a continuous treatment by the oscillations, while continuing to expose to the action ever new contact and reaction surfaces.

The initial feeding of the stock into the turbulent and recycling zone is regulated through inlet 14 so that the delivery of the stock in the latter leads to the optimal performance of the intended treatment for each particle of stock, before the latter departs from the oscillatory field to enter into the quiescent zone 19. After the stock rises to the level of the separating plane, the feed rate of the stock entering into the quiescent zone 19 is again reduced to such an extent that, for each unit of feed, the stock requires a markedly greater time to travel through the quiescent zone, than was required in the first processing stage. For example, in the oscillatory field 15 of the first stage the hourly rate of treatment of the stock is 100 cubic meters, given a 6% concentration, where the rate of feed is, for example, 10 centimeters per minute, while being recycled at the rate of 5 meters per second. Depending on the adjustment of the rate of delivery and quantity of the stock to be treated into the oscillatory field, the stock recycled in the oscillatory field and treated by the oscillations clears the first stage in 10 minutes, and thereupon reaches the quiescent zone.

The duration of the aging treatment in the second stage or quiescent zone is determined by the path covered by the stock during which the stock is increasingly quieted and aged until it has achieved an optimal degree of treatment. Thus, when the quantity of stock to be treated is 100 cubic meters which requires one hour for the completion of the requisite reaction, the column of stock, given a cross-section of 4 square meters, will have a height of 25 meters. If an output of 50 cubic meters per hour is desired, and a period of 1 hour of reaction time in the quiescent zone is required, and given a cross-section of 4 square meters, then the height of the column need be only 12.5 meters. Higher production rates can be achieved, by enlarging the cross-section of the column of stock in the quiescent zone, while reducing the reaction time until the reaction is completed, while the rate of feed of the stock into the first processing stage or turbulent zone is increased. Such a reduction of the requisite reaction time can be achieved by increasing the oscillating intensity. Thus, with a cross-section of the column of stock in the quiescent zone of 8 square meters, a production rate of 200 cubic meters per hour can be achieved with a column height of 12.5 meters. To reach a production rate of 200 cubic meters per hour without increasing the oscillation intensity, the column of stock would have to be doubled in height, that is up to 25 meters. However, in the event that, as practical tests have shown frequently, the required staying time (duration of stay) in the relatively placid or quiescent zone is only 30 minutes, which is the case for a large number of materials and reactions, then given a cross-section of the column of 8 square meters, an output of 400 cubic meters per hour can be achieved, for a column height of 12.5 meters.

Comprehensive practical tests, as in this example, have yielded cellulose with astonishingly enhanced quality, and the paper produced from such cellulose exhibits a strength of more than 300% as compared with paper produced from the same starting material treated in conventional digesters (beaters and refiners).

*Example 2*

A sulphate cellulose with a concentration of 6% is introduced at a temperature of 20° C., for the purpose of undergoing the treatment described in the foregoing, into the oscillatory field in the proximity of the oscillator and subjected to intensive recycling. The introduction of the stock into the oscillatory field is terminated when the level of the stock is approximately double the level of the separating plane at the top of the turbulent and recycling zone. Only that half of the stock which is in the turbulent zone is simultaneously subjected to the oscillations and recycled, while the oscillating energy is propagated in the half of the batch of stock in the quiescent zone at the rate of about 1500 meters per second. The oscillatory treatment of the stock is accomplished with a mechanical oscillator as disclosed in U.S. Letters Patent No. 2,789,800 at a frequency of 1000 kilocycles, with a specific intensity of 40 w. per square centimeter, and a duration of 4 minutes. The fibers of the stock treated in this manner exhibit undamaged lengths distinct fibrillation, and attendant good hydration. Dehydration on the formation of sheet from the treated cellulose takes place at a striking speed. The tearing length of the experimental sheet produced from untreated stock, was 3200 meters. Following the preliminary treatment described above, the tearing (breaking) length of the experimental sheet produced from the stock was increased to 6320 meters.

*Example 3*

Unbleached pine sulphite cellulose with a concentration of 5% is subjected to oscillatory treatment and intensive recycling in a batch process as described in Example 2, but with a frequency of 240 kilocycles and a specific intensity of 50 w. per square centimeter, for a period of 10 minutes. The length of the resultant fibers is unaffected. The tearing length of the experimental sheet produced from the untreated stock was 2630 meters. The tearing length of the experimental sheet produced from the stock which underwent the treatment described above as 6550 meters. The fibers are well fibrillated, and the dehydration of the treated stock is very good during formation of sheets therefrom.

*Example 4*

Dried pine wood shavings with a concentration of 7% in water, with a pH value of 7, were introduced at a temperature of 20° C. into the first stage at a feeding rate selected so that the suspension of the stock traversed the oscillatory field, or the first stage, while undergoing vigorous recycling, within a period of 5 minutes whereupon it passed into the second stage for aging. The height of the column of stock in the second stage, where aging takes place, was 6 meters, and the rate of feed of the stock in the second stage was 20 centimeters per minute. The stock which was intensively treated by oscillations in the first stage, passed through the second stage wtihin a period of 30 minutes. The resultant micrograph exhibited a marked conversion, on account of the oscillatory treatment in the first stage. The fibers contained a considerable proportion of pine cellulose fiber.

The stock treated as above with the concentration unaltered, but with the pH increased to 10, was then subjected identically to treatment in a two-stage consecutive process for the purpose of effecting bleaching therewith calcium hypochlorite. The stock introduced into the first stage at half the feeding rate employed in the initial treatment described above. As a consequence, the oscillatory treatment and recycling lasted 10 minutes in the first stage. Hence, the rate of feed was reduced by half after the stock passed into the second stage, that is to say, to 10 centimeters per minute, so that the stock column of the second stage attained a height of 6 meters only after 60 minutes. On attaining this level, that is, after 60 minutes of aging in the second stage, the stock attained a reflectance of 80.5%.

The treatment described in the foregoing, effected not only a marked refinement and bleaching of the wood pulp, but also of an unexpected enhancement of the strength of the cellulose batches. Thus, the tearing length of experimental sheets produced from the untreated wood pulp was 1200 meters, and the bursting strength was 1.1 kg. per square cm. The described treatment consisting of two successive stages, each made up of two operating steps, enhanced the tearing length of the exprimental sheet produced from the stock to 7500 meters and the bursting strength to 7.1 kg. per sq. cm. The dehydration of the sheets is highly satisfactory. Microscopic examination of the stock shows a cellulose-like structure of pine with invariably satisfactory fiber lengths and excellent fibrillation.

*Example 5*

To demonstrate the effectiveness of the process embodying the invention, a test has been conducted in which a high-quality paper is produced from the trapped chips or splinters obtained in the separator of a grinder, or so-called "cabbage" of pine. A 6% deposit of wood chips or splinters up to 10 centimeters in length was soaked in a 5% solution of NaOH, for a period of 14 hours at 20° C. and then delivered to the first stage of the process according to the invention. In such first stage, the stock is crushed by high-frequency shearing and impact effects and is simultaneously treated by high-frequency pulses in the sonic and ultrasonic range and by oscillations, while undergoing vigorous recycling in the first stage. The impact and oscillatory treatment of the suspension is regulated by setting the stock feed rate into the oscillatory field in relation to generator output, so that the stock remains in the first stage for 10 minutes while the oscillator operates at a frequency ranging from 1000 to 1600 kilocycles.

The rate of feed of the stock across the separating plane into the second stage or quiescent zone, is 20 cm. per minute, so that the stock column in the second stage attains a height of 6 meters within a period of 30 minutes. The product emerging from the second stage after a duration therein of 30 minutes, has a structure midway between that of high-quality pine wood pulp and pine cellulose. The length of the fibers is invariably and absolutely retained. The fibers are distinctly covered with fibrils which vary in length between long and short fibrils. The stock obtained in this manner is subjected, under identical conditions of concentration and initial temperature, to the same process according to the invention, while calcium hypochlorite is added and the mixture is heated to 50° C. The stock is delivered to the oscillatory field or first stage and the calcium hypochlorite is preferably also delivered at the same time into the oscillatory field, in the vicinity of the oscillator. Here again, the stock is vigorously recycled during the entire oscillatory treatment. The latter is so regulated, by appropriate setting of the stock feed rate into the oscillatory field, that is, into the first stage, that the duration of stay of the stock in the first stage, where it undergoes treatment by oscillation, along with the chlorine water, is 4 minutes. Thereupon the chlorinated stock flows through the separating plane into the second or aging stage in the quiescent zone, wherein the feed rate of the stock is adjusted, by appropriate dimensioning of the cross-section of the column of stock so that the stock column attains a level of 6 meters within the period of one (1) hour. The stock obtained from the second stage after one hour yields experimental sheet having a tearing length of 6400 meters. The bursting strength of the experimental (test) sheet is 6.3 per sq./cm., and the reflectance of the test sheets is 68%.

The stock which has been treated in the manner described above is subjected to a test treatment as follows:

The washed stock is again subjected to a treatment consisting of two consecutive stages, that is, oscillation treatment and aging treatment and 4% $Na_2SiO_3$ (42%) and 8% $H_2O_2$ (35%) are added to the stock during the course of such further treatment. The stock is fed with the above mentioned additives into the oscillatory field of the first stage at a rate which allows the stock to remain in the first stage for a period of 2 minutes. Thereafter, the stock makes its way through the separating plane to the second, or aging stage, and the rate of feed in the second stage is controlled so that the stock to be bleached attains the intended column level within a period of 60 minutes. The stock treated in this manner is a fibrous material, which is similar in appearance to pine cellulose. The completely defibered fibers fully retain their length and they exhibit a surprisingly good degree of fibrillation.

Experimental sheets produced from the stock thus treated exhibit a tearing length of 7500 meters and a bursting strength of 7.4 kg. per sq. cm. The reflectance is 82%.

In all of the above examples of processes embodying the invention, appreciable savings are realized in power consumption and in the consumption of chemical additives, such as, chlorine or $H_2O_2$, and also in the times required for completion of the treatments.

Although specific examples of processes and apparatuses embodying the invention have been given herein, these are merely illustrative and various changes and modifications may be effected therein by one skilled in the art without departing from the scope or spirit of the invention as defined in the appended claims.

What is claimed is:

1. A process for the oscillatory treatment of pumpable stock, comprising feeding the stock into a turbulent and recycling zone constituted by only part of a pressure chamber having at least one rotary mechanical oscillator therein subjecting the stock in said zone to continuous high speed recycling through a field of high-frequency oscillations for simultaneous refining and activation of the stock, controlling the rate of feed of stock into said turbulent and recycling zone so as to effect the gradual transfer, at a relatively low rate, of partial flows of the stock from said turbulent and recycling zone into a relatively quiescent zone formed by the remainder of said pressure chamber and in which aging of the previously refined and activated stock proceeds following a predetermined stay of the stock in said turbulent and recycling zone, and controlling the speed of rotation of said oscillator for regulating the speed at which the stock is recycled in said turbulent and recycling zone.

2. A process as in claim 1; wherein the stock is fed under pressure into said turbulent and recycling zone.

3. A process as in clain 1; wherein the rate of feed of stock into said turbulent and recycling zone is controlled by varying the cross-sectional area of an inlet therein.

4. A process as in claim 1; wherein the rate of feed of stock into said turbulent and recycling zone is controlled by generating a back-pressure resisting the feeding of stock into the pressure chamber.

5. A process as in claim 4; wherein said back-pressure is generated by throttling the feeding of stock at any point behind that at which stock is fed into the pressure chamber.

6. A process as in claim 4; wherein said back-pressure results from a head of the stock.

7. A process as in claim 4; wherein said back-pressure is generated by a gas under pressure introduced into said chamber.

8. A process as in claim 1; further comprising introducing at least one additive into the stock in said pressure chamber.

9. An apparatus for the oscillatory treatment of pumpable stock comprising a pressure tank having an inlet for the stock in one end portion thereof, at least one rotary mechanical oscillator in said one end portion of the tank generating a field of high-frequency oscillations and operative to effect high speed recycling flow of the stock through said field within a turbulent and recycling zone extending over only a part of the length of the tank, with the remainder of the length of the tank defining a relatively quiescent zone, means for regulating the rate of feed of stock through said inlet, thereby to determine the duration of the stay of the stock in said turbulent and recycling zone and the rate at which stock treated in the latter passes into said quiescent zone, and at least one outlet for withdrawing treated stock from said quiescent zone, said tank being shaped and dimensioned in the region of said oscillator to ensure that said recycling flow of the stock extends over substantially the entire cross-sectional area of the tank.

10. An apparatus as in claim 9; wherein said outlet is in the form of an overflow from said quiescent zone.

11. An apparatus as in claim 10; wherein said overflow is constituted by a riser pipe opening upwardly within said tank.

12. An apparatus as in claim 9; wherein said outlet has means for regulating the flow of treated stock therethrough.

13. An apparatus as in claim 9; wherein a plurality of outlets extend from said tank at spaced apart locations along the latter.

14. An apparatus as in claim 9; further comprising means in said tank promoting said recycling flow of the stock in said turbulent and recycling zone.

15. An apparatus as in claim 14; wherein said means promoting the recycling flow are fixed baffles.

16. An apparatus as in claim 14; wherein said means promoting the recycling flow are rotated pumping blades.

17. An apparatus as in claim 9; wherein said tank extends vertically.

18. An apparatus as in claim 17; wherein said one end portion of the tank is at the bottom of the latter.

19. An apparatus as in claim 17; wherein said one end portion of the tank is at the top of the latter.

20. An apparatus as in claim 9; wherein additional oscillators are provided in said one end portion of the tank, and at least one of said additional oscillators has an entrance and exhaust isolated from each other to prevent recycling of the stock treated therein.

21. An apparatus as in claim 20; wherein said one additional oscillator has means regulating the discharge of stock through said exhaust, thereby to control the duration of the stay of the stock in said turbulent and recycling zone and the generation of a back-pressure on the stock therein.

22. An apparatus as in claim 9; wherein said tank has different cross-sectional areas in said quiescent zone and in said one end portion, respectively.

23. An apparatus as in claim 9; further comprising at least one conduit extending into said pressure tank for supplying an additive to the stock being treated therein.

24. An apparatus as in claim 23; wherein said conduit for supplying additives opens within said oscillator.

References Cited by the Examiner
FOREIGN PATENTS 868,230 2/53 Germany.
956,546 1/57 Germany.

CHARLES A. WILLMUTH, *Primary Examiner.*